US007360081B2

(12) United States Patent
Pretorius

(10) Patent No.: US 7,360,081 B2
(45) Date of Patent: Apr. 15, 2008

(54) SYSTEM AND METHOD OF AUTHENTICATING AN ARTICLE

(75) Inventor: Albertus Jacobus Pretorius, Pretoria (ZA)

(73) Assignee: Centralised Authentication of Products (Pty) Ltd., Gauteng (ZA)

( * ) Notice: Subject to any disclaimer, the term of this patent is extended or adjusted under 35 U.S.C. 154(b) by 588 days.

(21) Appl. No.: 10/488,542

(22) PCT Filed: May 2, 2002

(86) PCT No.: PCT/ZA02/00070

§ 371 (c)(1),
(2), (4) Date: Aug. 3, 2004

(87) PCT Pub. No.: WO03/021541

PCT Pub. Date: Mar. 13, 2003

(65) Prior Publication Data

US 2004/0268130 A1 Dec. 30, 2004

(30) Foreign Application Priority Data

Sep. 4, 2001 (ZA) ................................ 2001/7316

(51) Int. Cl.
*G06F 1/24* (2006.01)

(52) U.S. Cl. ...................... 713/156; 713/151; 713/167; 713/168

(58) Field of Classification Search ................ 713/156, 713/151, 167, 168
See application file for complete search history.

(56) References Cited

U.S. PATENT DOCUMENTS

| | | | |
|---|---|---|---|
| 4,200,394 | A | 4/1980 | Bartlett et al. |
| 4,853,961 | A | 8/1989 | Pastor |
| 5,521,984 | A | 5/1996 | Denenberg et al. |

FOREIGN PATENT DOCUMENTS

| | | | |
|---|---|---|---|
| EP | 0 042 361 | A | 12/1981 |
| EP | 0 042 361 | A1 | 12/1981 |
| EP | 0 600 646 | A | 6/1994 |
| EP | 0 600 646 | A2 | 6/1994 |
| WO | 97/24699 | A | 7/1997 |
| WO | WO 97/24699 | A1 | 7/1997 |

OTHER PUBLICATIONS

Search Report for corresponding Chinese Application No. 02819818.2, filed Aug. 26, 2005.

*Primary Examiner*—Thomas R. Peeso
(74) *Attorney, Agent, or Firm*—Nixon & Vanderhye P.C.

(57) ABSTRACT

A method of authenticating an article includes the steps of, at an issuing station, selecting an inherent feature of the article and converting the feature into digital data to form an identification code for the article. An encryptor is used to encrypt the identification code utilizing a secret private key of an asymmetric encryption key pair and associated with the issuing party. The encrypted code is made available on a label accompanying the article. During a subsequent phase and at an authentication station, digital data relating to the feature is determined directly from the article and the code is decrypted utilizing a public key of the pair obtained from a third party in accordance with rules of a public key infrastructure. The determined data and the data relating to the feature retrieved from the decrypted code are compared to authenticate the article.

8 Claims, 9 Drawing Sheets

SYSTEM AND METHOD OF AUTHENTICATING AN ARTICLE

This application is the US national phase of international application PCT/ZA02/00070, filed in English on 02 May 2002, which designated the US. PCT/ZA02/00070 claims priority to ZA Application No. 2001/7316 filed 04 Sep. 2001. The entire contents of these applications are incorporated herein by reference.

TECHNICAL FIELD

THIS invention relates to a method and apparatus for certifying and authenticating a product or article.

A method of tracking an article wherein a secure code is applied to the article is disclosed in South African patent 97/6663. A problem with this method and system is that the proposed codes are cloneable which would compromise the method and system.

OBJECT OF THE INVENTION

Accordingly it is an object of the present invention to provide a method and system with which the applicant believes the aforementioned problems may at least be alleviated.

SUMMARY OF THE INVENTION

According to the invention there is provided a method of certifying an article, the method comprising the steps of:

- selecting an inherent feature of the article which is unique to one of:
  - the article; and
  - a group of such articles to which the article belongs and digitizable in the form of digital data uniquely defining the article or group;
- forming an identification code comprising the digital data; and
- making the identification code available.

The term “article” is used in this specification to denote naturally occurring or produced objects as well as artefacts, including digital products.

The identification code may be encrypted by utilizing one key of a pair of asymmetric encryption keys comprising a private key and a public key associated with a party performing or issuing the certification. The encryption is preferably performed utilizing the private key.

The private key is preferably a secret key and the public key may be controlled by a trusted third party according to rules of a public key infrastructure (PKI).

The code may be made available to the public by applying it to the article. The code is preferably applied to the article in a human and/or machine readable form, for example in the form of a bar code applied to the article, alternatively on a separate certificate, further alternatively on a label accompanying the article and still further alternatively and in a suitable application, included in a digital carrier, such as a digital watermark.

The inherent feature of the article may be the result of manipulation of the article, for example chemical manipulation or marking of the article, to embed a unique feature in or on the article.

The identification code may also comprise further data, such as data true to the article, for example historic data relating to the article. Such data may comprise data relating to an origin and/or an issuer of the article.

According to another aspect of the invention, a method of authenticating a certified article comprises the steps of:

- receiving the article together with an identification code comprising digital data relating to an inherent feature which is unique to one of the article and a group of such articles to which the article belongs;
- from the article, determining data relating to the inherent feature; and
- comparing said digital data in the identification code to the determined data relating to the inherent feature.

The identification code may be received in a form wherein it is encrypted by a private key of an asymmetric key pair also comprising a public key and the public key may be retrieved from a trusted third party and utilized to decrypt the identification code, before comparing said digital data in the identification code to the determined data relating to the inherent feature.

Also included within the scope of the present invention is a method of authenticating an article comprising the steps of:

- at an issuing station:
  - selecting an inherent feature of the article which is unique to one of the article and a group of such articles to which the article belongs and which is digitizable in the form of digital data;
  - forming an identification code comprising the digital data;
  - encrypting the identification code with a private key of an asymmetric encryption key pair also comprising an associated public key, to form an encrypted identification code; and
- at an authentication station
  - from the article, determining data relating to the inherent feature;
  - utilizing the public key to decrypt the encrypted identification code, to yield decrypted data; and
  - comparing said determined data and said decrypted data.

Further included within the scope of the present invention is a system for certifying an article, the system comprising:

- apparatus for analyzing the article and converting an inherent feature of the article which is unique to one of the article and a group of such articles to which the article belongs into digital data; and
- a data processor for forming an identification code for the article comprising said digital data.

The data processor may comprise an encryptor for encrypting the identification code utilizing a private key of an asymmetric encryption key pair also comprising an associated public key.

Still further included within the scope of the present invention is a system for authenticating a certified article, the system comprising:

- apparatus for analyzing the article and for deriving from the article digital data relating to an inherent feature which is unique to one of the article and a group of such articles to which the article belongs; and
- a data processor for comparing the derived data and an identification code supplied with the article and which code comprises digital data relating to the inherent feature.

The identification code may be supplied in a form wherein it is encrypted by a private key of an asymmetric encryption key pair also comprising a public key and the data processor may utilize said public key to decrypt the encrypted identification code, before comparing the derived data and the identification code.

BRIEF DESCRIPTION OF THE ACCOMPANYING DIAGRAMS

The invention will now further be described, by way of example only, with reference to the accompanying diagrams wherein.

DESCRIPTION OF PREFERRED EMBODIMENTS OF THE INVENTION

Figure 1:
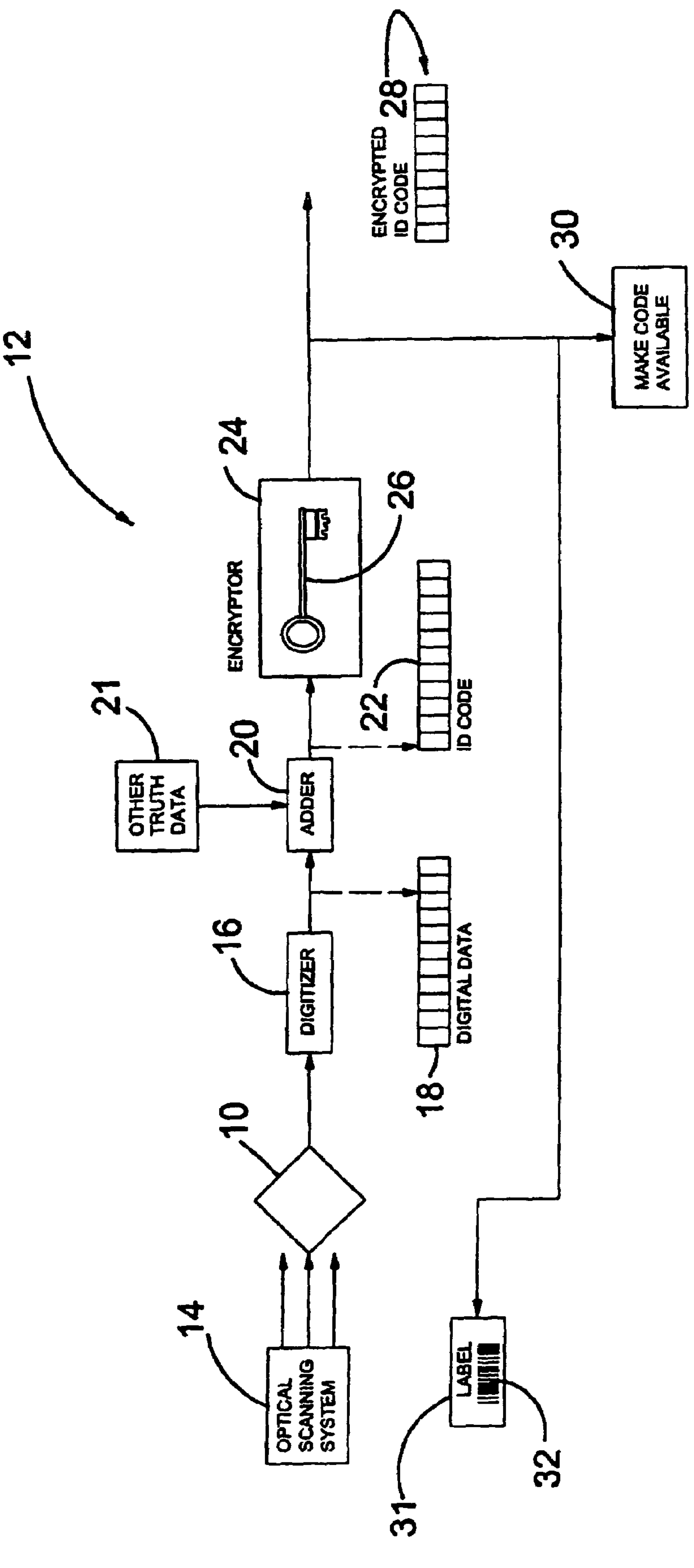
FIG. 1 is a block diagram of a certification system according to the invention.
Figure 2:
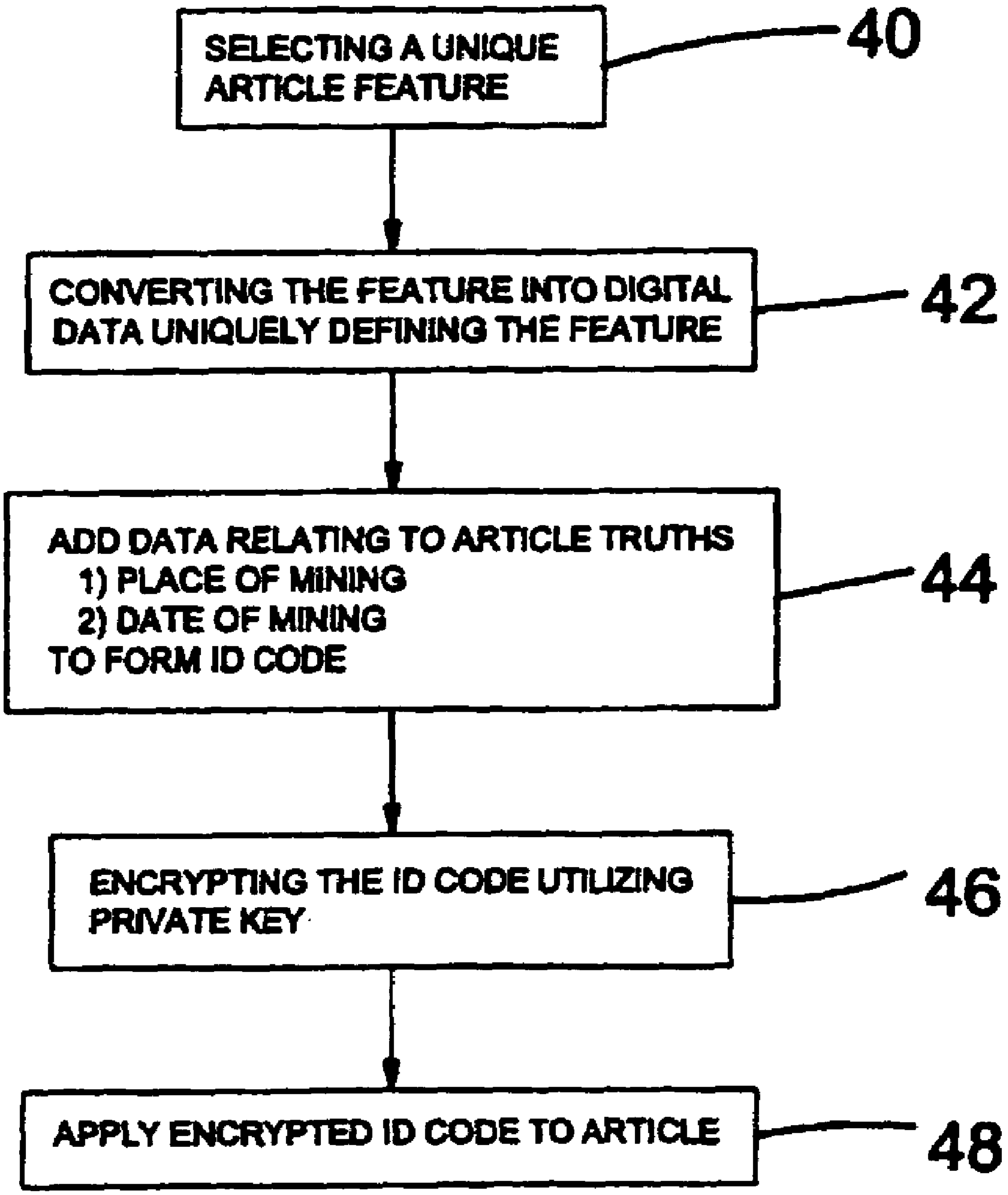
FIG. 2 is a flow diagram of a certification stage of an authentication method according to the invention.
Figure 3:
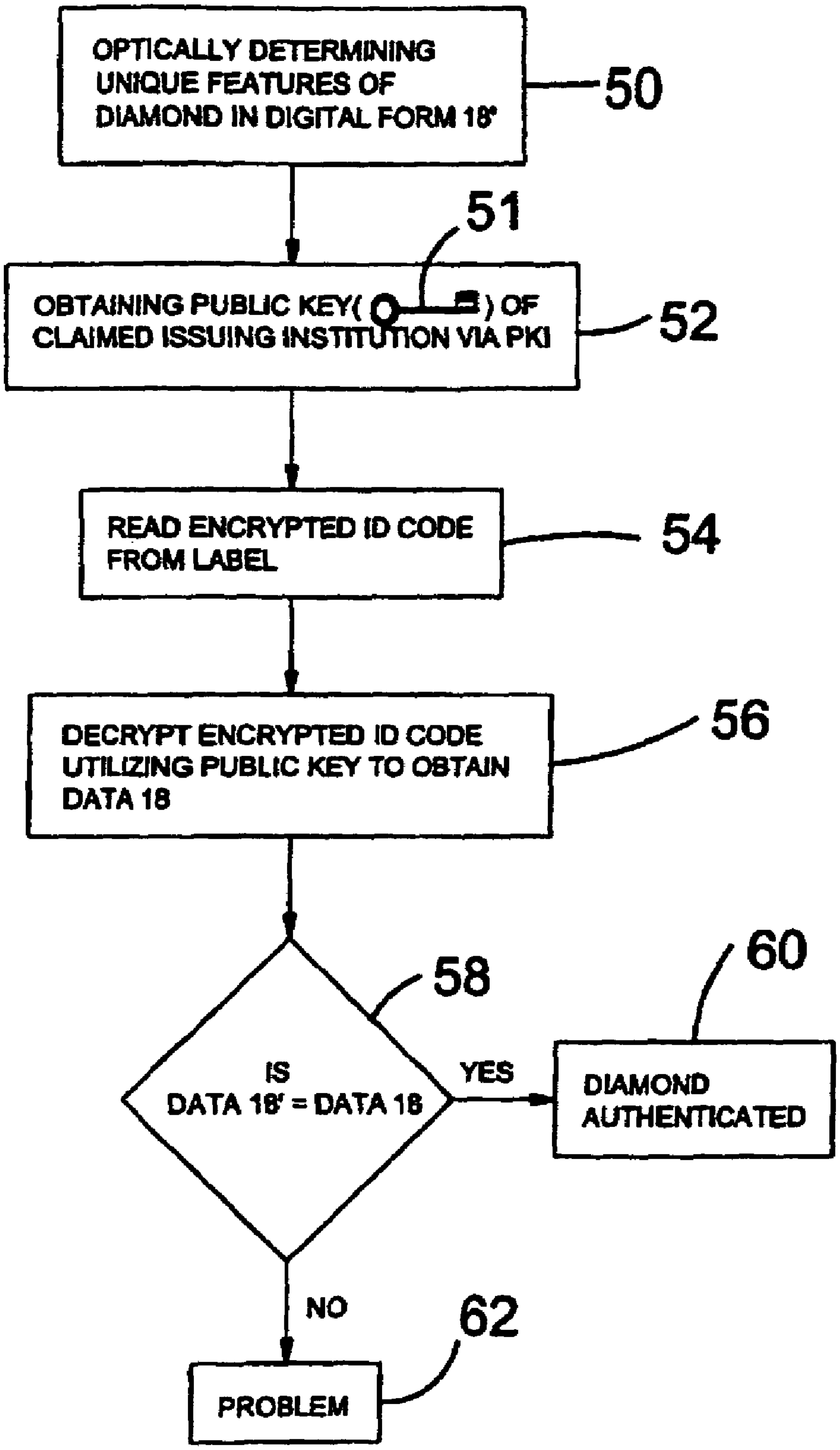
FIG. 3 is a diagrammatic illustration of a subsequent authentication stage of the method according to the invention.
Figure 4:
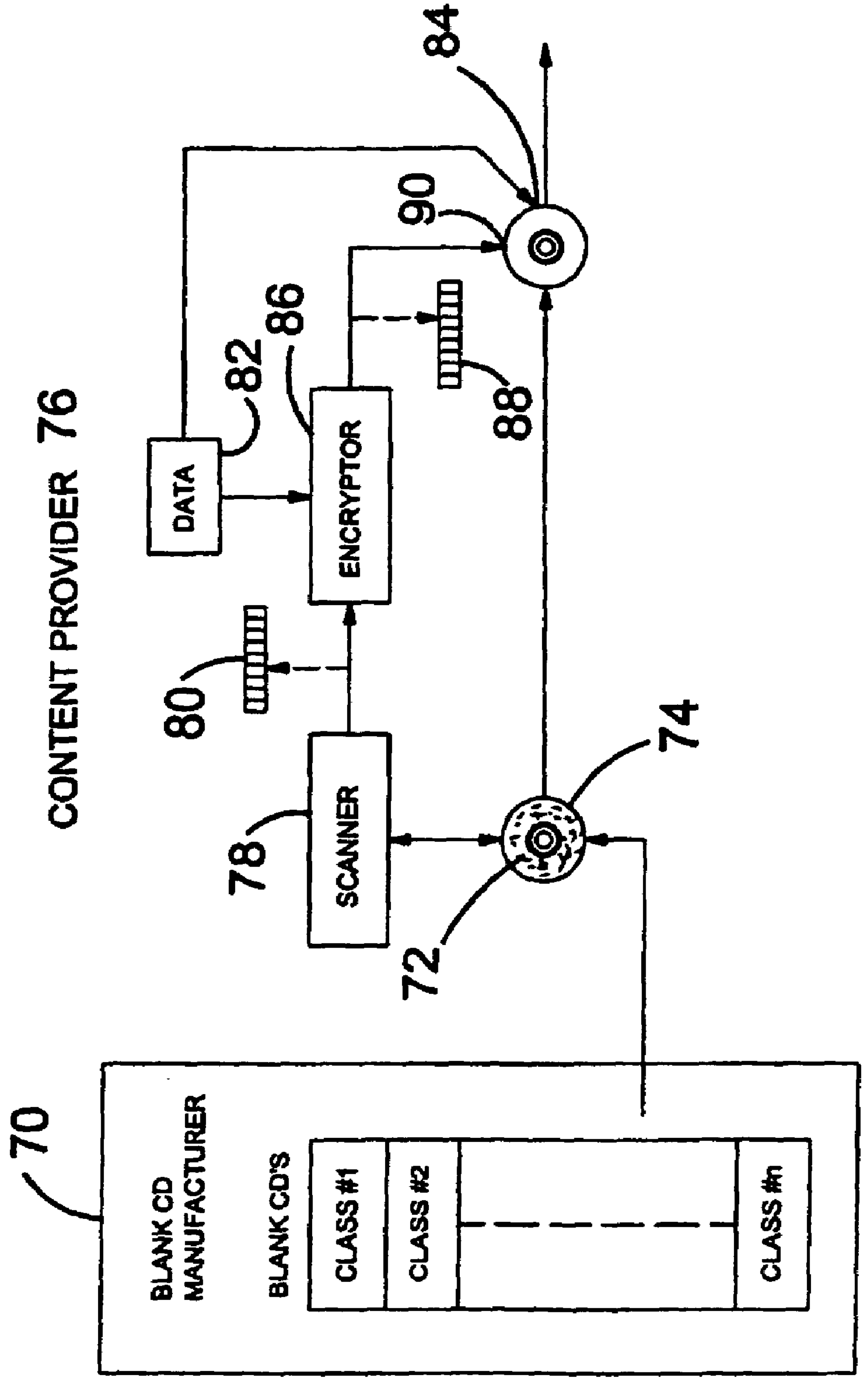
FIG. 4 is a block diagram of a second embodiment of the system for certifying compact discs.

A system and method for certifying and authenticating an article such as a diamond 10 is illustrated in FIGS. 1 to 3.

The system 12 comprises an analyzing device, for example an optical scanner 14 and digitizer 16 for converting a selected inherent unique feature of the diamond into a string of digital data 18. The unique feature may relate to one or more of flaws in the diamond, size of the diamond, color of the diamond, etc. The digital data hence defines the diamond 10 uniquely enough in terms of inherent features of the diamond. Since no two diamonds are identical in the aforementioned respects, a string of digital data 18 defining a first diamond differs from a similar string of digital data defining a second diamond.

At adder 20, other truth data 21 about the diamond may be added to the string of digital data 18 to form an identification (ID) code 22 for the diamond. This truth data may comprise data relating to the name of an issuing institution such as a mining company (MCO) that mined the diamond, data relating to a date (xx/yy/zz) on which the diamond was mined and data (ABC) relating to the location (e.g. country and district) of the mine where the diamond was mined. It will be appreciated that the other truth data is not necessarily unique to a particular diamond.

At encryptor 24 the ID code 22 is encrypted in known manner utilizing a private key 26 of a pair of asymmetric keys, to form an encrypted ID code 28. The encryption is performed in accordance with known rules and conventions of a public key infrastructure (PKI) comprising a trusted third party as certification authority (CA). It is well known that in such an infrastructure the key pair comprising the private and a public key is generated. The private key is kept secret by the intended user (in this case the issuing institution, such as the mining company) and the public key is controlled and made available to prospective users by the CA through the infrastructure. It is further known that only the public key can decrypt what was encrypted-utilizing the private key and vice versa.

The encrypted ID code 28 is made available to the public at 30 on a separate printed certificate (not shown) or in any other suitable manner. In a preferred form, the encrypted code 28 is applied to the article 10, for example in the form of a bar code 32 on a label 31 accompanying the diamond.

The steps in the certification or issuing stage of the method according to the invention referred to herein before are illustrated in FIG. 2. At 40, the unique feature is identified and the feature is digitized at 42 to yield digital data 18. The other truth data is added at 44 and at 46 the encrypted ID code 28 is formed by encrypting the plain text ID code 22 utilizing the private key 26 of the mining company. The encrypted ID code is applied to the diamond 10 in the form of a bar code on the label 31 accompanying the diamond, as illustrated at 48 in FIG. 2.

Referring to FIG. 3, authenticity of a diamond issued as hereinbefore described, is determined by an article authenticator utilizing the following steps. The article authenticator may be a jeweler and the diamond may be offered to the jeweler by a party claiming the diamond to have the properties set out in known manner in the aforementioned accompanying certificate, including the name of a claimed issuing institution.

In a first step 50 which is similar to step 42 in FIG. 2, the jeweler determines directly from the diamond digital data 18' relating to the unique features of the diamond. By utilizing the name of the claimed issuing institution, the jeweler retrieves via the PKI in well known manner the public key 51 of the claimed issuing institution as shown at 52.

At 54, the encrypted ID code 28 is read by reading bar code 32 in known manner. At 56 and by utilizing the public key 51, the encrypted ID code 28 is decrypted to obtain digital data 18. In a case where no identity of an issuing institution is claimed, the jeweler may determine the issuing institution by sequentially trying, through a process of elimination, the retrieved public keys of well known issuing institutions in the relevant industry, until the encrypted ID code 28 is successfully decrypted.

At 58, data 18' and data 18 are compared and if the portions thereof representing the unique features of the diamond are the same, the diamond is determined to be what the claimant claims it to be, as shown at 60. If not, and as shown at 62, the claims about the identity and the origin of the diamond are proved to be questionable.

In another application, discs, such as compact discs (CD), carrying digital data, including recorded music or computer software, may be certified and authenticated.

A manufacturer 70 of blank discs may manufacture the plastic disc body with higher density plastic particles embedded therein to provide a pattern 72 of such particles embedded in the disc body 74. However, depending on factors such as the resolution of pattern scanning apparatus, the patterns may randomly fall into n groups or classes namely, class #1 to class #n of discs, wherein each class accommodates discs having substantially the same pattern so embedded. The number of classes and size of a class would be determined by the resolution of the equipment. Hence, the value of n may be determined and then the scanning and/or implanting equipment is selected such as to make cloning of the system not economically viable for a pirate or copying party.

At a content provider 76, the blank CD body 74 of which the aforementioned pattern falls into any one of the aforementioned classes, preferably according to a flat random distribution, is scanned by a scanner 78, to provide digital data 80 relating to the pattern. The content data 82, is written onto the body at 84 in known manner. The pattern data 80 and content data 82 are encrypted at encryptor 86 as hereinbefore described by computing a hash (#) and digitally signing the said data and further data relating to the provider 76 with a private key of the content provider, to provide an encrypted identification code 88. The encrypted code 88 is also written onto the CD at 90 for example in the form of or as part of a digital watermark serving as carrier therefor.

In other embodiments, a manufacturer may cause or embed as herein described in each article of a group or batch of articles a single unique digitizable feature which is common to all articles in the group. Digital data relating to that feature may also be used in an identification code as herein described. A typical application may be in tablets or capsules, for medical use.

In the event of a suspected pirate or copied version of the CD, a law enforcement agency for example, may scan the disc to determine the pattern data directly from the disc. The content data is also relatively easily establishable. A public key of the provider 76 is obtained according to the PKI rules from a trusted third party and utilized to decrypt the encrypted code written on the CD as hereinbefore described, to provide decrypted data. The decrypted data and scanned pattern data are compared to determine whether the CD originates from the genuine content provider 76.

Figure 5:
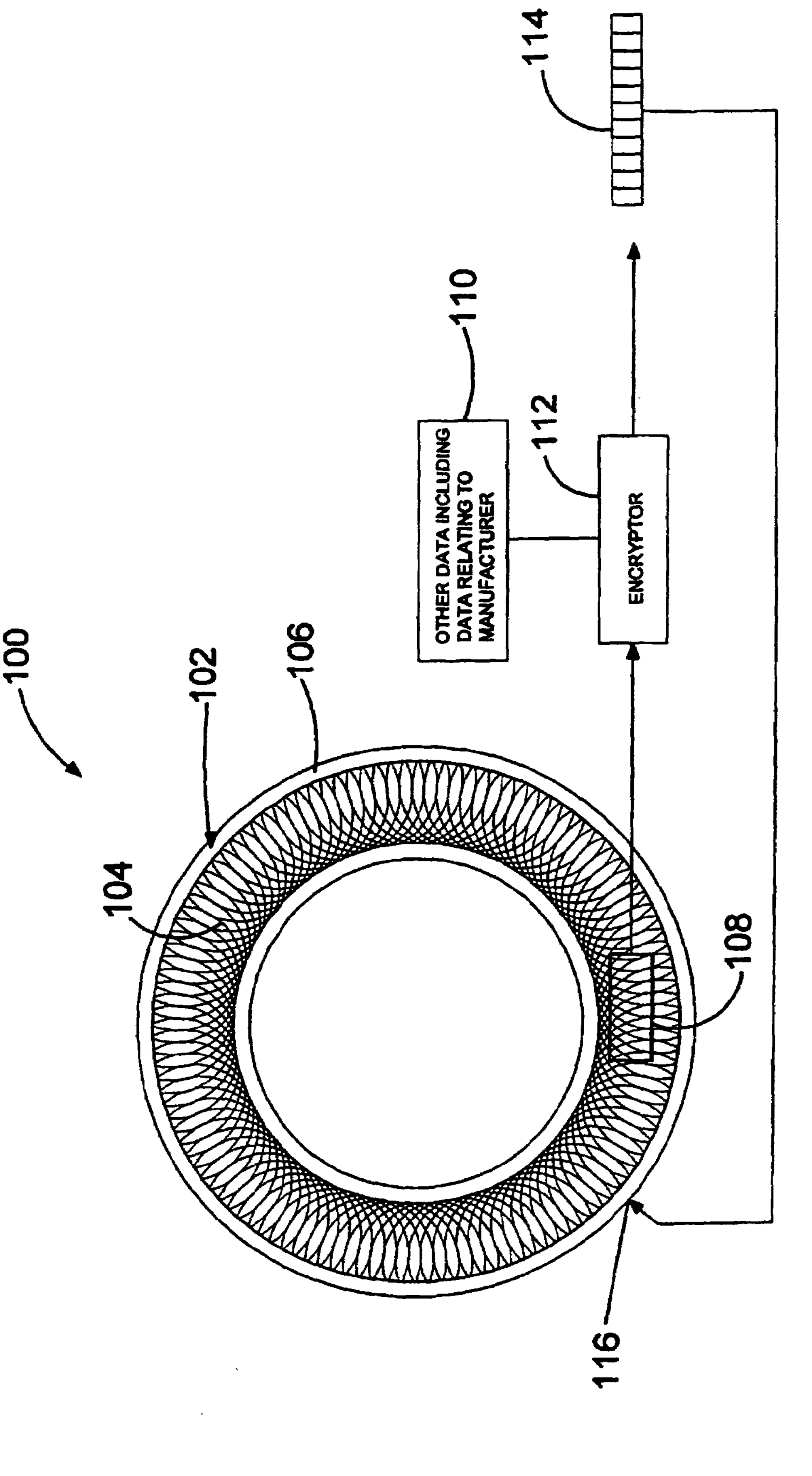
FIG. 5 is a block diagram of a third embodiment of the system for certifying automobile tyres.

In yet another application, tyres 100 shown in FIG. 5 for vehicles may be authenticated. It is known that a tyre 100 comprises a casing 102 which is normally handmade of Kevlar fiber 104 for reinforcing a rubber body 106 of the tyre. The Kevlar casing has a random pattern with a uniqueness of in the order of 1:100000. It is believed that this is a currently economically viable uniqueness for this application. Digital data relating to the Kevlar pattern within a frame 108 on the tyre is obtained with a suitable scanner. Other data 110 relating to the tyre including data relating to the manufacturer and the pattern data are encrypted at encryptor 112, to provide an encrypted code 114. The encrypted code 114 is applied to the tyre at 116 and/or is provided on a separate certificate. To determine the authenticity of a tyre, the pattern in the same frame 108 must be determined. Pattern data so determined is then compared with the pattern data extracted from the encrypted code in a decryption process utilizing the public key of the manufacturer. If there is a match, the tyre is what it is claimed to be.

Figure 6:
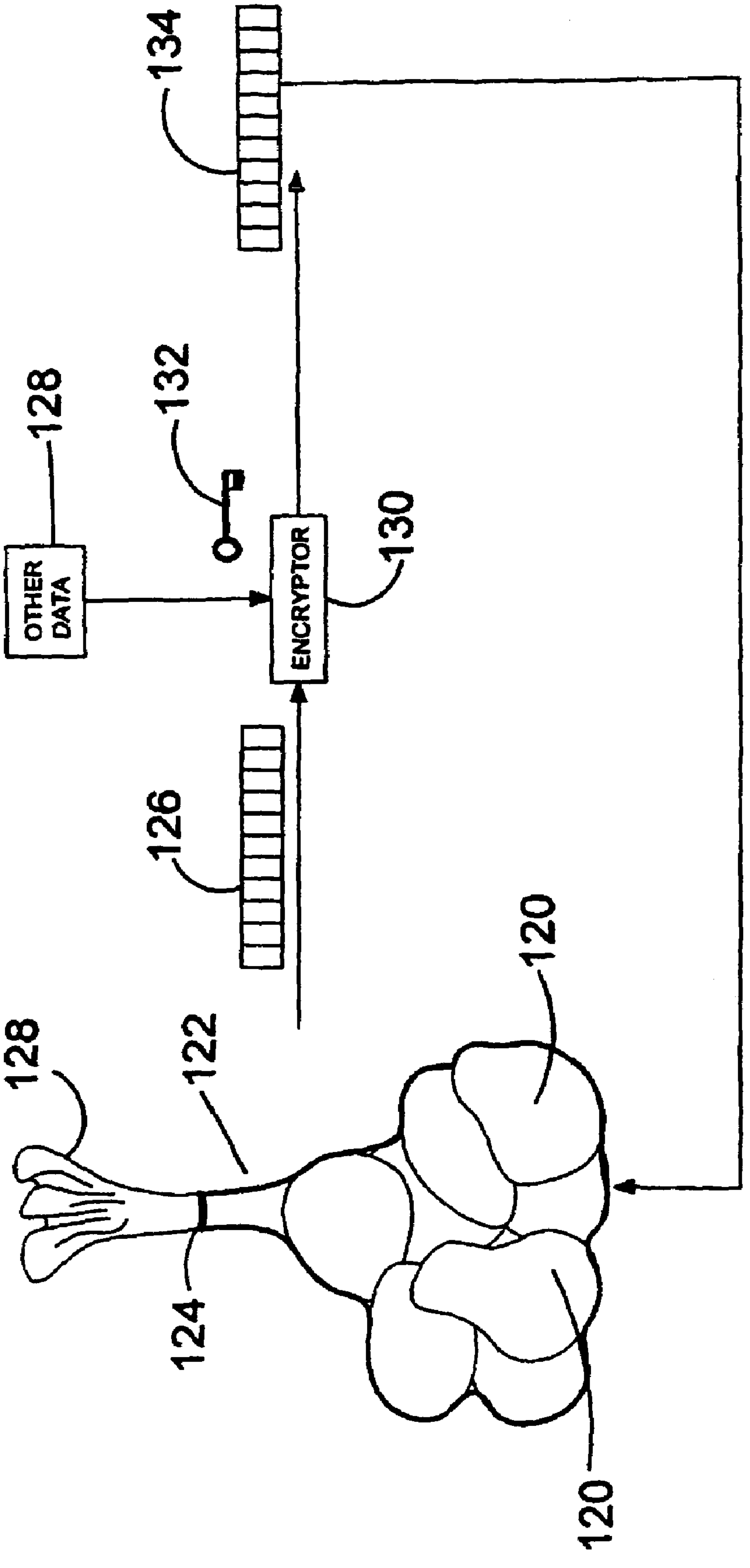
FIG. 6 is a block diagram of a fourth embodiment of the system for certifying pouches of uncut or raw diamonds.

Another application is illustrated in FIG. 6. Articles such as raw diamonds 120 may be vacuum-packed in a transparent air impermeable pouch 122 having a seal 124. The shape and/or configuration of the bag may be digitized to obtain digital data 126 relating to the shape and configuration which would be unique enough to a particular package 128. As in previous examples, the data 126 and other data 128 including identification data relating to a packager or miner of the diamonds are encrypted at encryptor 130 as hereinbefore described by means of a private key 132, to yield an encrypted code 134. The encrypted code may be applied to the package 128. Subsequent authentication will be done in a manner similar to that hereinbefore described with reference to the previous examples.

A unique enough digitizable feature may be caused or implanted in an article upon manufacture such as in the aforegoing example of CD bodies. Other such examples are luxury stationary, such as pens, wherein higher density particles or foreign particles may be added to the material from which a body of the article is formed, thereby to embed a unique pattern of such particles in the body. In yet other cases, the feature may be caused post manufacture. For example, small cracks may be caused in bodies of cast metals, such as aluminium, and which cracks form a random digitizable pattern unique, difficult and/or uneconomic enough to clone.

Similar to the example of the Kevlar pattern in the tyres described with reference to FIG. 5, grain or other patterns in a frame of a sheet or piece of paper used for financial instruments such as bank notes, cheques and other potentially valuable paper instruments, such as scratch cards and lottery tickets may be used to authenticate such items.

Another example where an inherent feature of an article may be used is the random pattern of electron sensitive regions on a cathode ray tube (CRT) used for computer and other screens and monitors.

Figure 7:
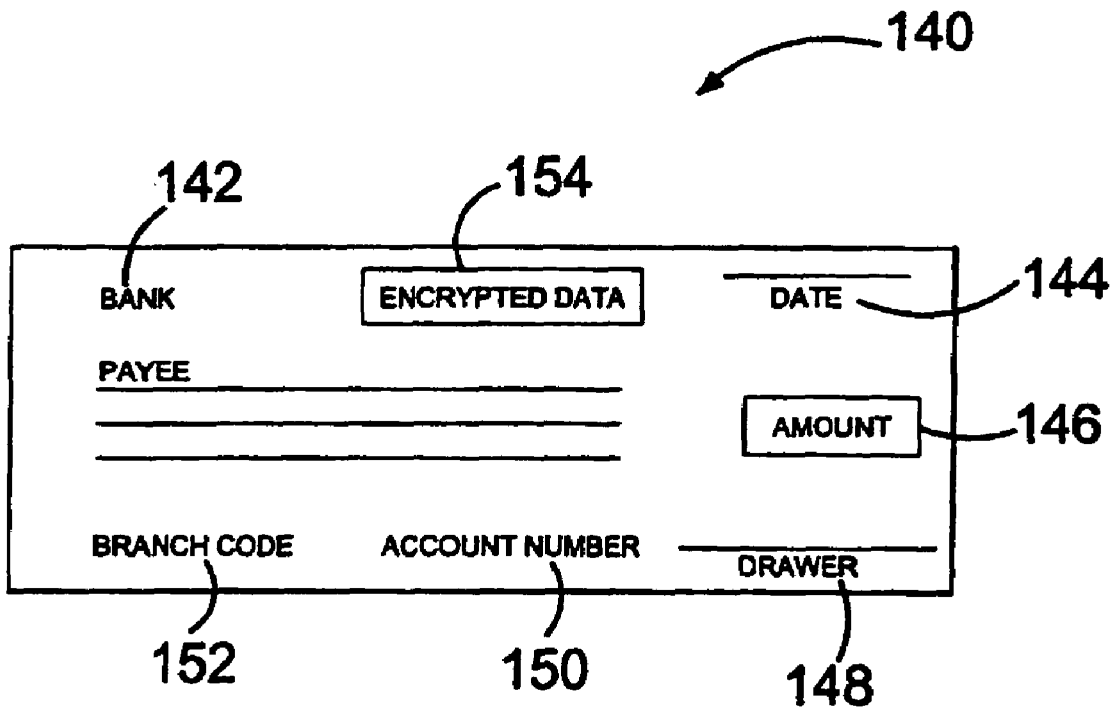
FIG. 7 is a diagram of a negotiable instrument that may be authenticated in accordance with the method of the invention.

Whereas the aforementioned examples mainly relate to digitizable images of at least part of an article or item, information content may also be utilized as a unique enough digitizable feature of an article. For example, in the case of a cheque 140 shown in FIG. 7, drawn by a bank, government institution or other body, any combination of information on the cheque, such as data relating to the drawer bank 142, the date 144, the amount 146, the drawer 148, account number 150 and branch code number 152 may be encrypted utilizing a private key of the drawer 148, to yield an encrypted code. The encrypted code may be applied in human or machine perceivable form at 154 on the cheque. Subsequent authentication of the cheque 140 is performed in a manner similar to that described in respect of the other applications hereinbefore described.

Figure 8:
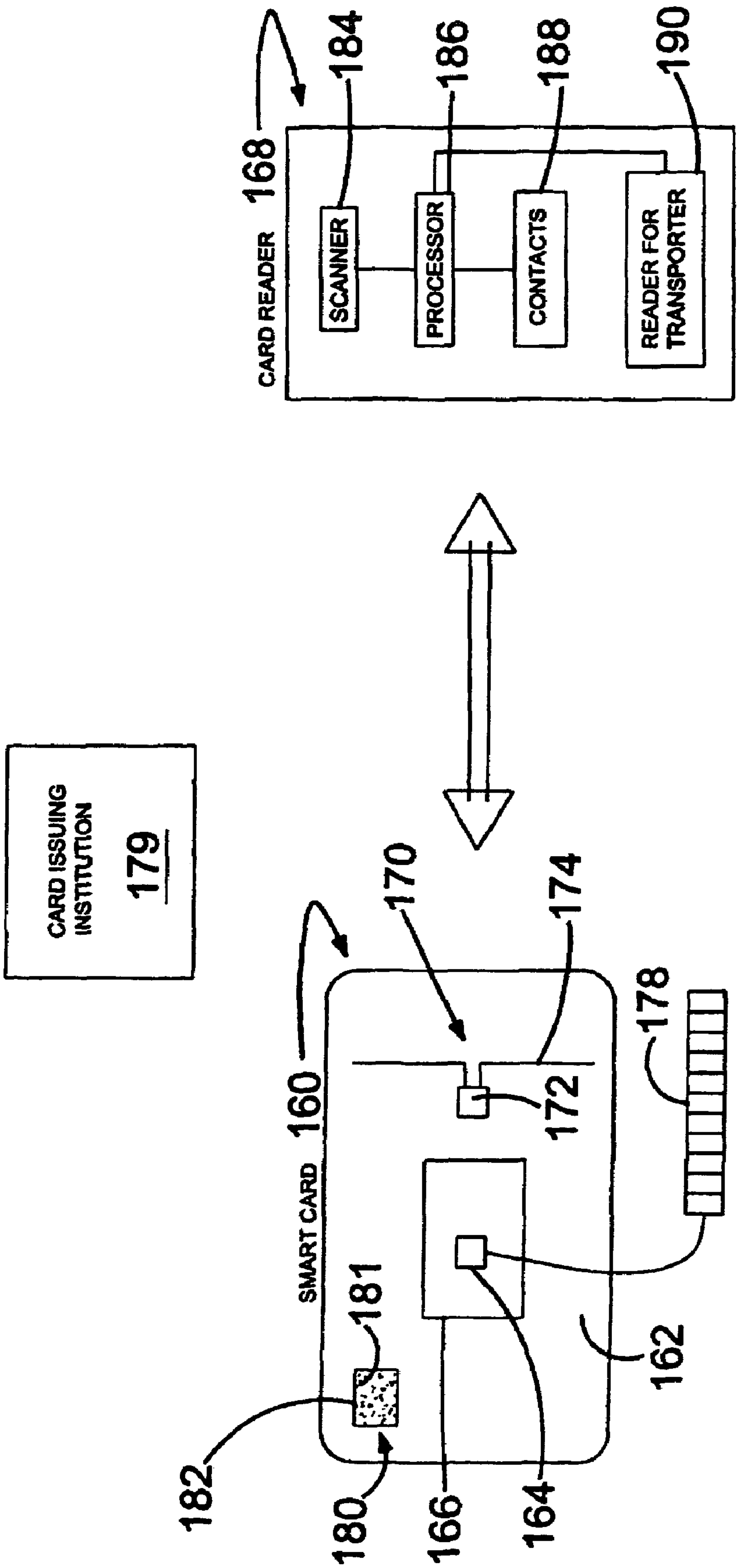
FIG. 8 is a block diagram of a fifth embodiment of the system for authenticating so-called intelligent smart cards.

In another application shown in FIG. 8, a so-called intelligent smart card 160 is depicted. The card 160 comprises a plastic body 162 hosting an embedded processor 164 and associated circuitry 166 including a contact arrangement for connecting the card to external circuitry, such as reader 168. Also carried by the body 162 is an RF transponder 170 comprising a chip 172 and an antenna 174.

An encrypted code 178 encrypted by a private key of an institution 179 which issued the smart card 160 is stored in a memory arrangement of the smart card. The encrypted code 178 comprises an identification (ID) code associated with the smart card and one or both of an indestructible identification (ID) code once written only into the transponder chip 172 upon manufacture thereof on the one hand and data relating to a pattern 180 of high-density particles 181 or a grain within a particular frame 182 on the plastic body on the other hand.

An authentication system in card reader 168 comprises a pattern scanner 184 connected to a central processor 186. Contacts 188 to be brought into engagement with the contact arrangement on the card are also connected to the processor. A reader 190 for the transponder 170 is also connected to the processor 186.

When the card 160 is inserted into the card reader 168, the processor 186 utilizes a public key of the issuing institution 179 to decrypt the encrypted code 178 read via contacts 188, to extract plain text data relating to the ID code of the card, the ID code of the transponder chip and/or the pattern 180. The processor also receives data relating to the scanned pattern from scanner 184, data relating to the ID code of the smart card received via contacts 188 and data relating to the ID code of the transponder received from reader 190. This data is compared as hereinbefore described to determine whether the card is a genuine card or a fake card.

Figure 9:
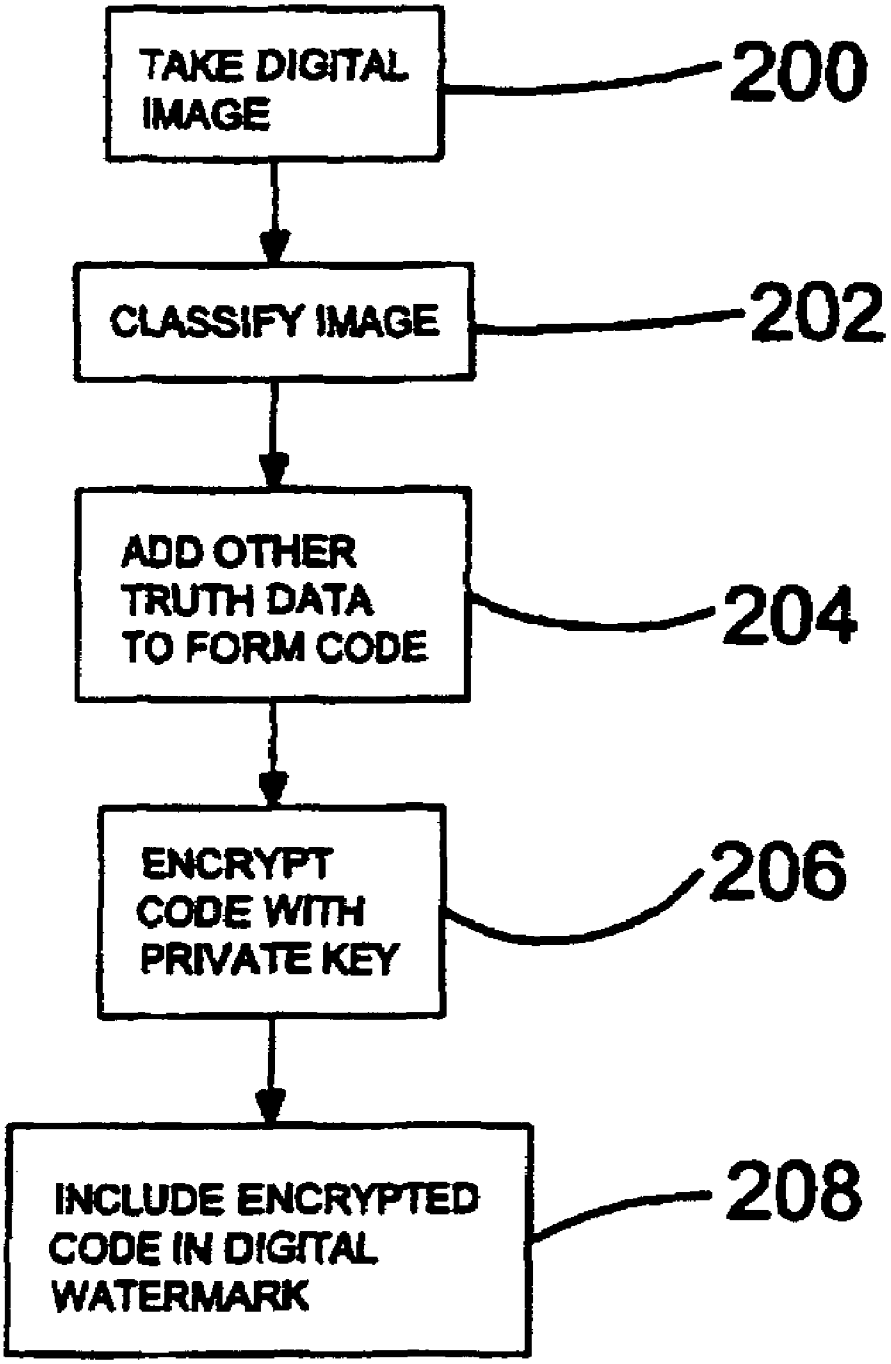
FIG. 9 is a flow diagram illustrating a sixth embodiment of the system for certifying a digital artefact.

In yet another embodiment illustrated in FIG. 9, a digital artefact such as a piece of digitally recorded music or a computer program may be certified and authenticated. In a first step 200, a digital image of at least part of the artefact is obtained. At 202, the resolution is determined to ensure that the images fall according to a random distribution into n available classes. The classes being large enough to accommodate image manipulation, for example by cropping and resolution changes, but small enough to statistically provide a unique enough class to deter fraudulent activities on an economical basis. At 204, the image data and other truth data relating to the artefact are combined to form a code. At 206, the combined code data is encrypted utilizing a private key of an asymmetric encryption key pair as hereinbefore described. Finally at 208 the encrypted code is included in a digital watermark embedded in the digital artefact. The extraction of the relevant data during a second stage of an authentication process is similar to that described hereinbefore.

The invention claimed is:

1. A method of certifying a plurality of articles, the method comprising the steps of:

selecting a common inherent feature of the articles, the feature being digitizable in the form of digital feature data;

the feature being selected, such that the articles are divided into n classes, wherein n is smaller than the number of articles constituting the plurality of articles, and wherein all the articles in each class are represented by respective unique digital class feature data derived from the feature;

forming an identification code for each article in each class comprising the respective unique digital class feature data and at least one of data relating to an identity of a party performing the method and data relating to an origin of the article;

encrypting the identification code utilizing a private key of an asymmetric key pair associated with the party performing the method, the key pair also comprising a public key;

the private key being a secret key and the public key being controlled by a trusted third party; and making the encrypted identification code available for subsequent authentication of the article.

2. The method as claimed in claim 1 wherein the encrypted identification code also comprises further data relating to the article.

3. The method as claimed in claim 1 wherein the encrypted identification code is made available to the public by at least one of: applying the code to the article, applying the code to a separate certificate; applying the code to a label accompanying the article; and including the code in a digital carrier.

4. The method as claimed in claim 1 wherein the inherent feature of the article is the result of manipulation of the article.

5. A system for certifying a plurality of articles, the system comprising:

apparatus for analyzing a common inherent feature of the articles and converting the feature into digital feature data, the feature being selected such that the articles are divided into n classes wherein n is smaller than the number of articles constituting the plurality of articles, and wherein all the articles in each class are represented by respective unique digital class feature data derived from the feature;

means for forming an identification code comprising the respective unique digital class feature data and at least one of data relating to a party certifying the article and data relating to an origin of the article;

an encryptor for encrypting the identification code utilizing a private key of an asymmetric key pair associated with the party certifying the article, the key pair also comprising a public key which is controlled by a trusted third party; and means for making the encrypted identification code available for subsequent authentication of the article.

6. A method of certifying and authenticating an article of a plurality of articles comprising the steps of:

at an issuing station, selecting a common inherent feature of the articles and which feature is digitizable in the form of digital feature data;

the feature being selected such that the articles are divided into n classes wherein n is smaller than the number of articles and wherein all the articles in each class are represented by respective unique digital class feature data derived from the feature;

forming an identification code for each article in each class comprising the respective unique digital class feature data and at least one of data relating to an identity of a party performing the method and data relating to an origin of the article;

encrypting the identification code utilizing a private key of an asymmetric key pair associated with the party performing the method, the key pair also comprising a public key;

the private key being a secret key and the public key being controlled by a trusted third party;

making the encrypted identification code available at an authentication station;

from the article, determining data relating to the inherent feature;

utilizing the public key to decrypt the encrypted identification code, to yield decrypted data; and comparing said determined data and said decrypted data.

7. A method of authenticating a certified article comprising the steps of:

receiving the article together with an identification code comprising digital data relating to an inherent feature which is unique to a group of articles to which the article belongs, the code being asymmetrically encrypted by a first key of an asymmetric key pair also comprising another key;

utilizing the other key to decrypt the code and extracting the digital data;

from the article, determining data relating to the inherent feature; and comparing, off-line, said digital data in the identification code to the determined data relating to the inherent feature.

8. A system for authenticating a certified article, the system comprising:

apparatus for analyzing the article and for deriving from the article digital data relating to an inherent feature which is unique to a group of articles to which the article belongs;

a data processor for decrypting, utilizing one key of an asymmetric key pair, an asymmetrically encrypted identification code for the article comprising digital data relating to the inherent features; and a comparator for comparing the derived data to the decrypted data.

* * * * *